C. CHRISTIANSEN.
HAY AND SHOCK LOADER.
APPLICATION FILED JUNE 12, 1911.
1,029,791.
Patented June 18, 1912.
4 SHEETS—SHEET 1.
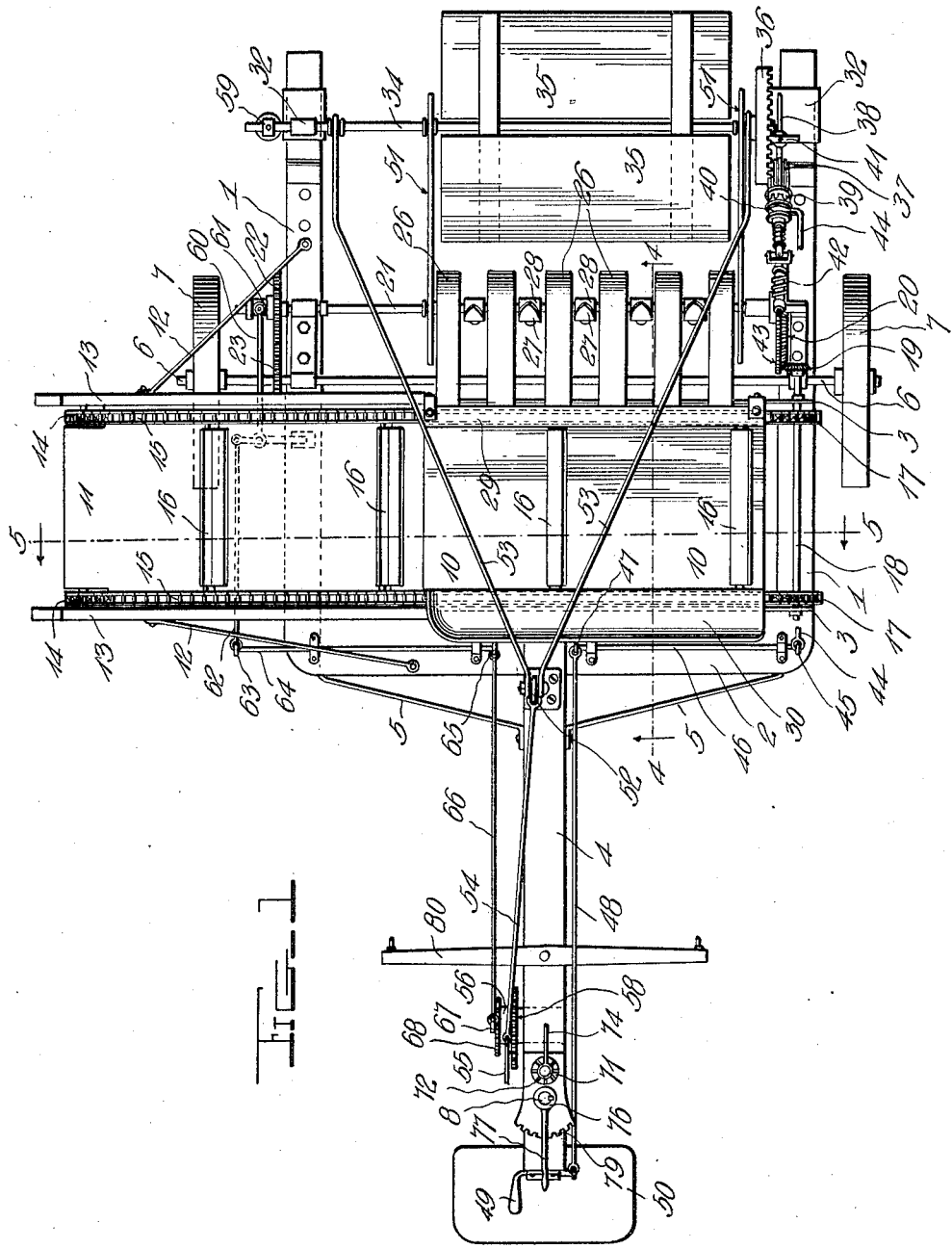
Witnesses
Inventor
C. Christiansen
by Attorneys C. CHRISTIANSEN.
HAY AND SHOCK LOADER.
APPLICATION FILED JUNE 12, 1911.
1,029,791.
Patented June 18, 1912.
4 SHEETS—SHEET 2.
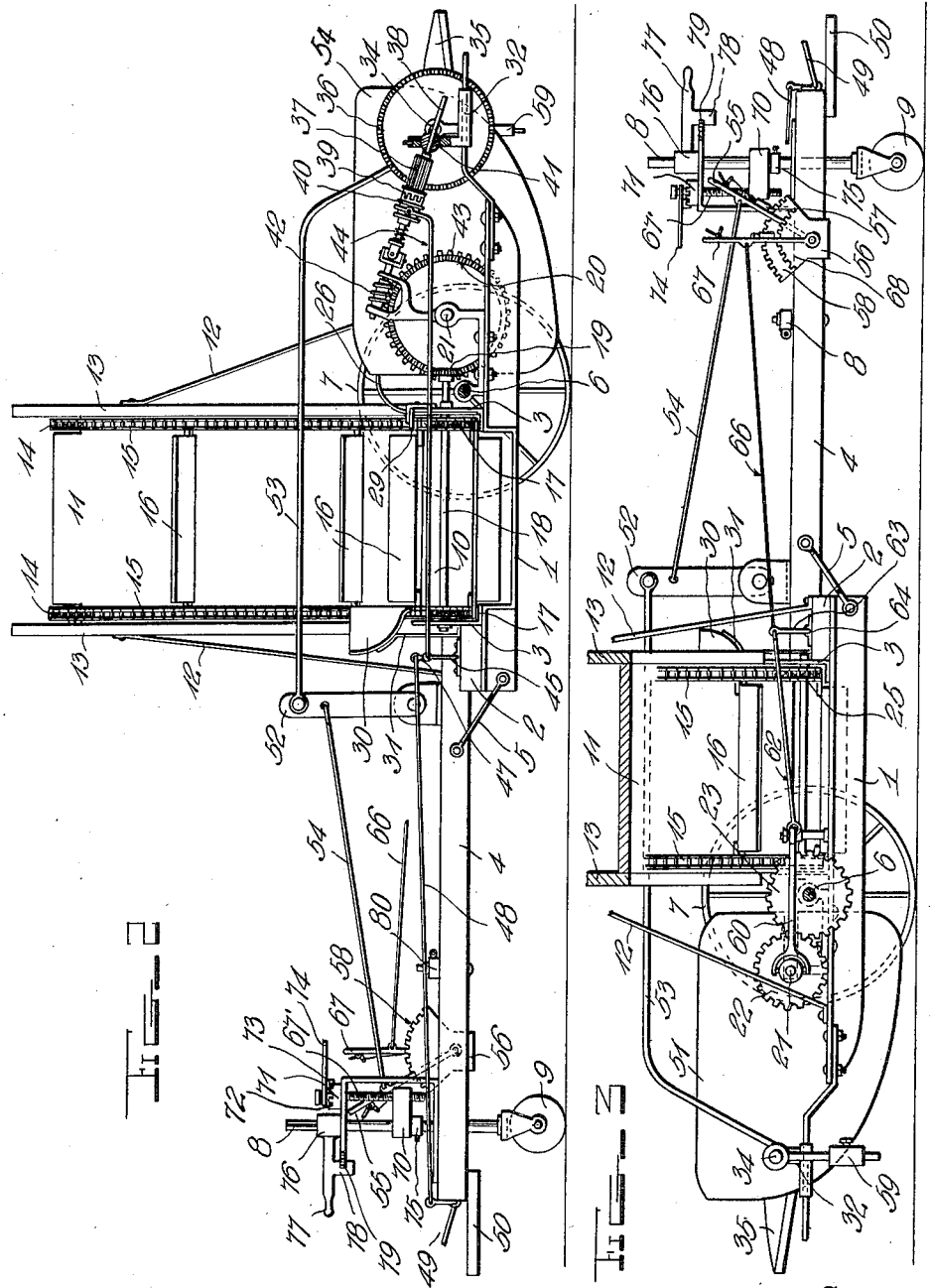
Witnesses
Inventor
C. Christiansen
by
Attorneys C. CHRISTIANSEN.
HAY AND SHOCK LOADER.
APPLICATION FILED JUNE 12, 1911.
1,029,791.
Patented June 18, 1912.
4 SHEETS—SHEET 3.
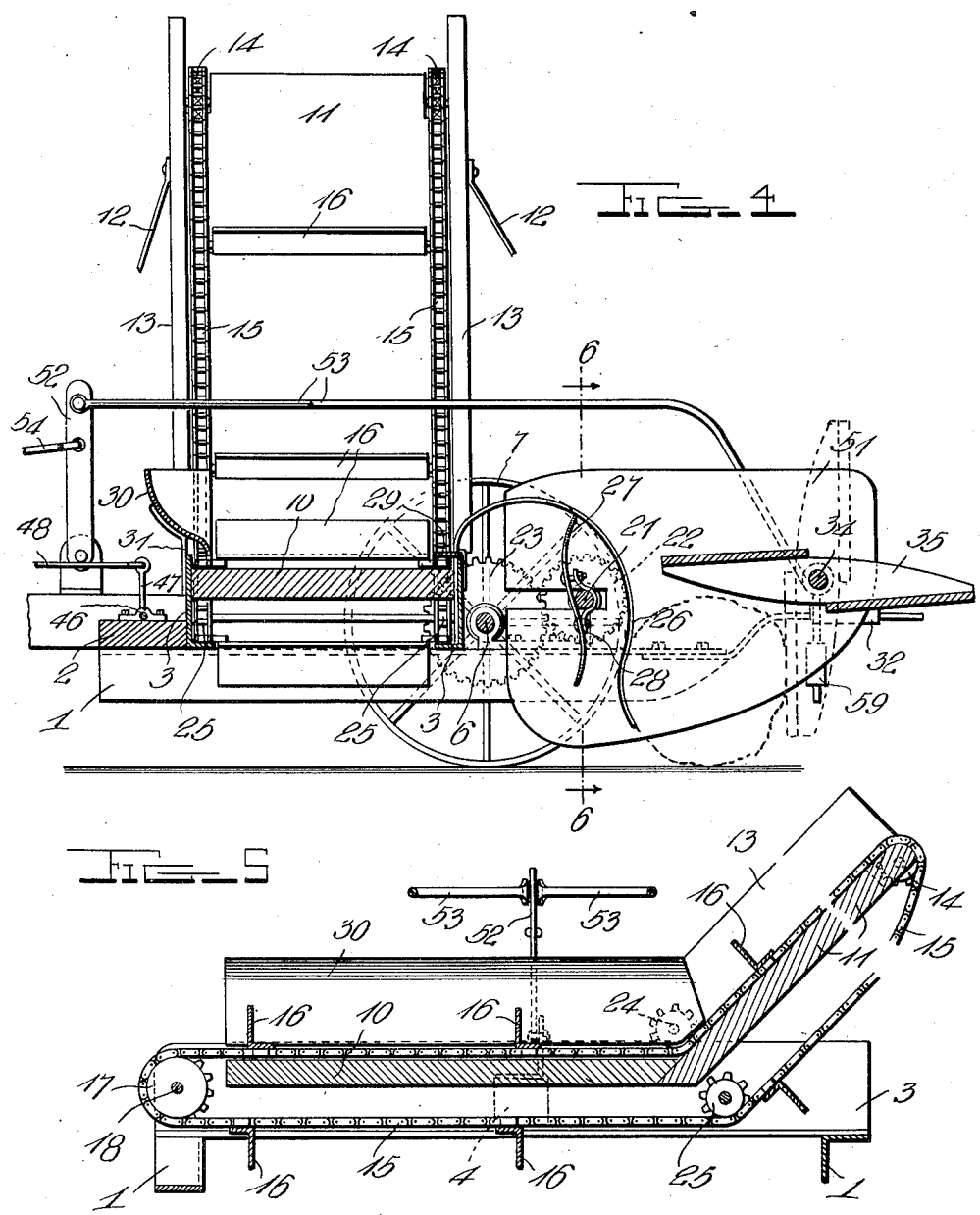

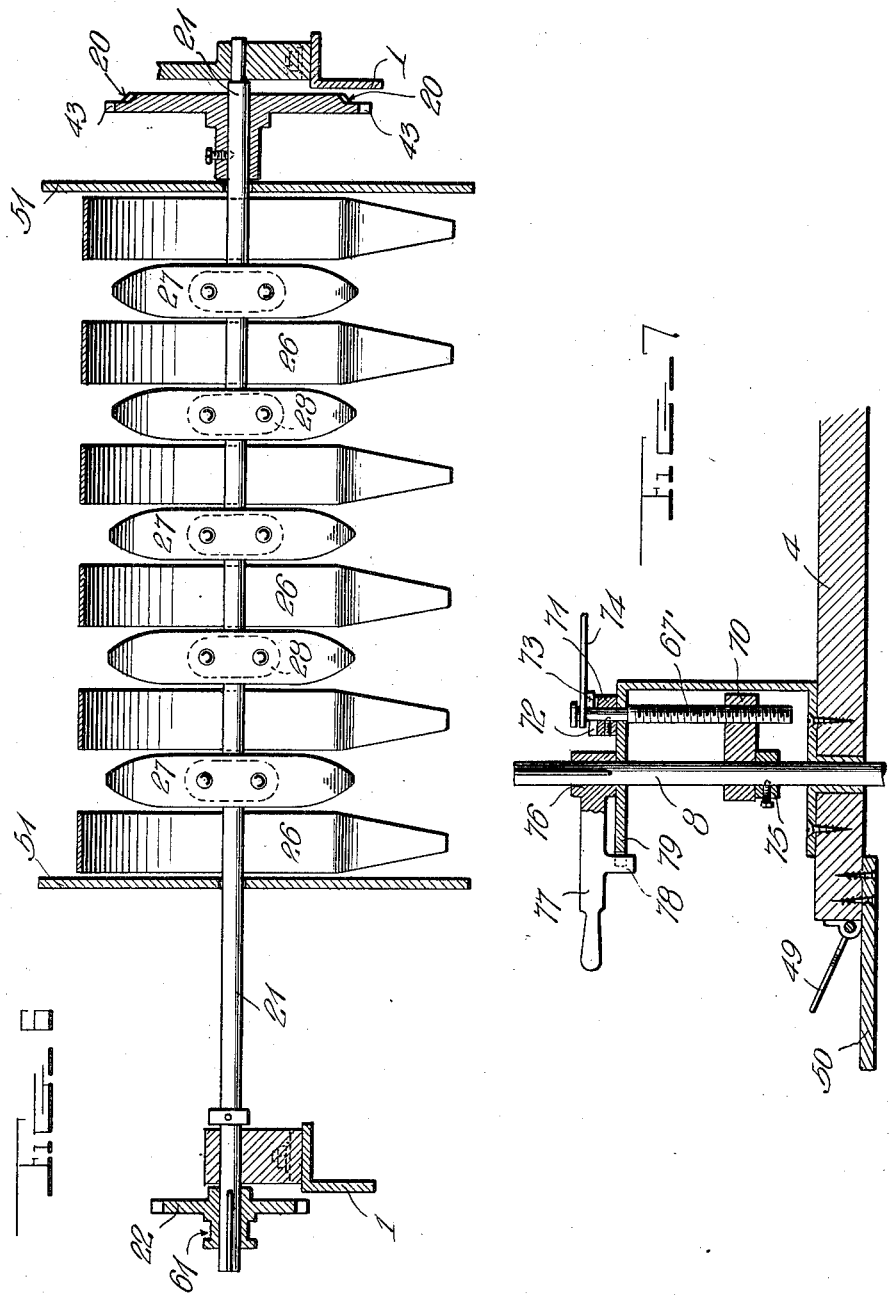

UNITED STATES PATENT OFFICE.

CHRISTIAN CHRISTIANSEN, OF KENMARE, NORTH DAKOTA, ASSIGNOR OF ONE-HALF TO LOUIE FREDRICKSON, OF KENMARE, NORTH DAKOTA.

HAY AND SHOCK LOADER.

1,029,791. Specification of Letters Patent. Patented June 18, 1912.

Application filed June 12, 1911. Serial No. 632,646.

*To all whom it may concern:*

Be it known that I, CHRISTIAN CHRISTIANSEN, a citizen of the United States, residing at Kenmare, in the county of Ward and State of North Dakota, have invented certain new and useful Improvements in Hay and Shock Loaders; and I do declare the following to be a full, clear, and exact description of the invention, such as will enable others skilled in the art to which it appertains to make and use the same.

This invention relates to improvements in combined hay and shock loaders.

One object of the invention is to provide a loader of this character whereby loose hay or bound shocks of grain may be readily taken up and loaded into a wagon.

Another object is to provide a machine of this character having means whereby the shock lifting mechanism may be quickly stopped and started thus preventing the same from engaging the shock before the machine is in position to receive the same.

With these and other objects in view, the invention consists of certain novel features of construction, combination and arrangement of parts as will be more fully described and claimed.

In the accompanying drawings: Figure 1 is a plan view of my improved hay and shock loader; Fig. 2 is a side view thereof with parts broken away and in section; Fig. 3 is a similar view of the opposite side; Fig. 4 is a central vertical longitudinal section on an enlarged scale taken approximately on the line 4—4 of Fig. 1; Fig. 5 is a vertical cross sectional view taken on the line 5—5 of Fig. 1; Fig. 6 is a cross sectional view on the line 6—6 of Fig. 4; Fig. 7 is an enlarged detail vertical sectional view through the standard of the steering wheel and the adjacent parts.

My improved hay and shock loader comprises a supporting frame, consisting of longitudinally disposed side bars 1 which are connected by a rear cross bar 2 and angle iron conveyer guiding bars 3. To the rear cross bar 2 is connected a rearwardly projecting tongue 4 which is braced at its inner end by inclined brace bars 5. Revolubly mounted in suitable bearings on the side bars 1 of the frame is a supporting and main operating shaft 6 on the outer ends of which are fixedly mounted supporting and driving wheels 7. Revolubly mounted in suitable bearings on the rear end of the tongue 4 is a caster wheel standard 8 on the lower end of which is arranged a caster wheel 9 by means of which the machine is steered and the rear end thereof supported.

Secured to the cross bars 3 is the horizontal lower portion of a conveyer bottom 10 the upper inclined portion 11 of which is secured to one end of the horizontal portion 10 and extends upwardly therefrom at a suitable angle as shown. The inclined bottom 11 is supported by upwardly extending brace bars 12 which are secured at their lower ends to a suitable part of the main frame of the machine. The inclined bottom of the conveyer is provided with parallel side flanges 13 and in the upper end of the bottom adjacent to the opposite sides thereof are revolubly mounted sprockets 14 around which are adapted to pass the chains 15 of an endless shock and hay conveyer, said chains being connected at intervals by right angular cleats 16 the ends of which are secured to the links of the chains as shown. The chains 15 pass around drive sprockets 17 fixedly mounted on the conveyer operating shaft 18 journaled in the ends of the bars 3 and having on its forward end a beveled gear pinion 19 which is engaged and driven by a bevel gear 20 fixed on the adjacent end of a counter shaft 21 journaled in suitable bearings in the side bars of the frame. On the opposite end of the shaft 21 is slidably keyed a spur gear pinion 22 which is in operative engagement with a similar pinion 23 on the main supporting and operating shaft 6. The upper stretches of the chains 15 are held down in engagement with the bottom of the conveyer at the lower end of the inclined portion thereof by sprocket gears 24, while the lower stretches of the chain which pass beneath the conveyer bottom are guided and held in position beneath the lower end of the inclined bottom of the conveyer by idle sprocket gears 25.

Secured to the forward cross bar 3 are a series of forwardly and downwardly curved spring guide teeth 26 which are spaced a suitable distance apart and have their lower ends terminating near the ground and bent backward to a slight extent as shown clearly in Fig. 4. Secured to the counter shaft 21 and adapted to be revolved thereby between the guide teeth 26 are a series of double ended hay and shock lifting fingers 27 the ends of which are bent in opposite directions as shown. The fingers 27 are here shown and are preferably secured to the shaft 21 by clips 28 which are arranged and fastened in place by ribs and bolts as shown. Arranged over the upper stretch of the horizontal portion of the elevating chain adjacent to the inner ends of the guiding teeth 26 is a guard plate 29 which is secured at its opposite ends to and supported by suitable brackets the lower ends of which are secured to the adjacent cross bar 3. By thus arranging the guard plate 29 the hay is prevented from being caught or tangled in the links of the chain when thrown onto the bottom of the conveyer by the lifting fingers 27. Along the rear side of the horizontal portion of the conveyer bottom is a shield or guard plate 30 which is supported upon suitable brackets 31 secured to the adjacent cross bars 2 and 3 as shown.

Revolubly mounted in bearing brackets 32 detachably secured to the curved forward ends of the side bars 1 is a reel operating shaft 34 on which is mounted a shock engaging and lifting reel 35 which, when the machine is employed for loading shocks will be engaged with the shocks whereby the latter are lifted up over the teeth 26 from which they are thrown by the revolving fingers 27 onto the conveyer. On one end of the reel shaft 34 is fixedly mounted a crown gear 36 with which is engaged an elongated spur gear pinion 37 loosely mounted on a flexible power transmitting shaft 38 and having formed thereon one member 39 of a clutch. The opposing clutch member 40 which coacts with the clutch member 39 is slidably keyed on the shaft 38 and is adapted to be shifted into engagement with the clutch member 39 thereby locking the pinion 37 to the shaft. The shaft 38 is mounted at its outer end in bearing brackets 41 arranged on the adjacent removable bearing bracket 32 of the reel shaft and at its inner end said shaft 38 is revolubly mounted in a bearing bracket secured to one of the side bars of the frame. On the inner end of the shaft 38 is arranged a worm 42 which is engaged with an annular series of worm teeth 43 formed on the outer edge of the bevel gear 20 on the adjacent end of the counter shaft 21.

The clutch member 40 is adapted to be shifted on the shaft 38 to bring the same into and out of engagement with the clutch member of the elongated pinion 37 by a shifting rod 44 the forward end of which is loosely connected with said clutch member 40. The inner end of the rod 44 is connected to a crank arm 45 on the outer end of a rock shaft 46 which is mounted in suitable bearings on the rear cross bar 2 and has on its inner end a crank arm 47 which is connected by a rod 48 to a foot lever 49 secured to the rear end of the tongue immediately above the platform 50, which is arranged on this end of the tongue as shown.

Secured to the reel shaft 34 adjacent to the opposite end of the reel are fender plates 51 between which the shocks pass when acted on by the lifting mechanism. The reel is adjusted to bring the same closer to or farther from the guiding teeth 26 by means of a suitable shifting mechanism comprising a main shifting lever 52 which is pivotally connected at its lower end to the bracket secured to the inner end of the tongue of the machine as shown. To the upper end of the lever 52 are connected the inner ends of diverging reel shifting bars 53 the outer ends of which are curved downwardly and engage with the reel shaft adjacent to its outer ends as shown. The lever 52 is connected by an operating rod 54 to a hand lever 55 which is pivotally connected at its lower end to a bracket 56 secured to one side of the tongue and which is provided with a locking pawl 57 adapted to be engaged with a segmental rack 58 whereby the shifting mechanism is locked to hold the reel in its adjusted position thus permitting the same to be readily engaged with shocks of different sizes.

By providing means for throwing the reel into and out of gear the same may be stopped when the machine is approaching a shock and until the shock is in position to be entirely engaged by the blades or arms of the reel thus preventing the reel from cutting the shock in two as might occur if the reel was continuously revolved when the machine was approaching the shock and before the latter was in position for being lifted by the reel. In order that the blades of the reel will always stop in a horizontal position when the reel is thrown out of gear, I provide the reel shaft on one end with a weighted crank arm 59 which will swing downwardly when the reel is stopped and which is so arranged on the shaft with respect to the blades of the reel that the latter will be swung to a horizontal position and thus held until the driving mechanism of the reel is again started. By slidably connecting the bearing brackets of the reel shaft with the forward ends of the side bars 1, the reel and its operating mechanism together with the fender plates may be entirely removed from the machine by disconnecting the adjusting mechanism thus facilitating the use of the machine as a hay loader.

The lifting and elevating mechanism as well as the reel may be thrown out of operation when desired by disconnecting the pinion 22 on the counter shaft 21 from the pinion 23 on the main operating and supporting shaft, said pinion 22 being slidably keyed to the shaft 21 for this purpose. In order to thus disengage the pinion 22 from the pinion 23 I provide a suitable pinion shifting mechanism comprising a bell crank shifting lever 60 which is pivotally mounted on a suitable bracket on the adjacent side bar 2 of the frame. One end of the lever 60 is adapted to be engaged with an annular groove 61 formed in the extended hub of the pinion 22 while the opposite end of the lever is connected by a rod 62 to a crank arm 63 formed on one end of a rock shaft 64 mounted on the rear cross bar 2 of the machine. On the opposite or inner end of the rock shaft is also formed a crank arm 65 which is connected by an operating rod 66 to a hand lever 67 pivoted to a segmental rack 68 formed on the bracket 56 to which the reel adjusting lever 55 is connected. The hand lever 67 is provided with a suitable locking pawl whereby the same may be locked in its adjusted positions for holding the pinion 22 in and out of engagement with the pinion 23.

The rear end of the machine is adapted to be raised or lowered on the standard 8 of the caster wheel 9 and the forward end of the machine thus adjusted to the desired height by means of a raising and lowering mechanism comprising a raising and lowering screw 67' which is suitably mounted in the bracket of the standard 8 and has an operative engagement with a nut 70 arranged on said standard as shown. On the upper end of the screw above the bracket is fixed a head 71 having in its upper side a series of radially disposed notches 72 with which is adapted to be engaged a tooth 73 formed on a screw operating lever 74 which is loosely mounted on the upper end of the screw as shown. On the standard below the nut 70 is secured a stop collar 75 which is engaged by the nut and the latter thus held so that when the screw is turned therein the tongue will be raised or lowered and the forward end of the machine thus tilted or adjusted to the desired height. On the upper end of the standard 8 is slidably keyed a bearing bracket 76 in the outer end of which is pivotally mounted a steering lever 77 on the outer side of which is formed an integral pawl 78 which is adapted to be engaged with the teeth of a rack 79 secured to the upper end of the standard supporting bracket as shown. By thus arranging the steering lever 77 the caster wheel may be turned in the desired direction for steering or directing the machine.

To the tongue 4 a suitable distance in front of the platform 50 are arranged draft connections 80 whereby draft animals may be hitched at the opposite sides of the tongue and thus push the machine ahead of themselves as will be readily understood. By thus arranging the draft mechanism of the machine the driver may readily see the shocks of grain or piles of hay to be loaded and may direct the machine to the proper position for loading the same.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention claimed.

Having thus described my invention, what I claim is:

1. In a combined shock and hay loader a wheeled supporting frame, an elevator operatively mounted in said frame, a series of guide teeth arranged on the forward end of the machine, a series of revolubly mounted lifting fingers adapted to work between and together with said teeth whereby the shock or hay is lifted onto said elevating mechanism, a shock engaging reel adjustably and removably engaged with the forward end of said frame, and means whereby the machine is pushed forwardly by the draft animals hitched thereto.

2. In a combined shock and hay loader, a supporting frame, a supporting and operating shaft revolubly mounted in said frame, supporting wheels fixed on the outer ends of said shaft, an endless elevator arranged on said frame a revolubly mounted counter shaft geared to said operating and supporting shaft, an elevator operating shaft geared to said counter shaft, a series of forwardly projecting downwardly curved guide teeth, a series of lifting fingers fixedly mounted on said counter shaft and adapted to work between said guide teeth whereby the grain or hay is lifted and thrown onto said elevator, bearing brackets adjustably and detachably engaged with the forward end of the supporting frame, a reel shaft revolubly mounted in said brackets, means to operatively connect said shaft with said counter shaft whereby said reel shaft is driven in the proper direction, means to throw the same out of gear, a reel fixedly mounted on said shaft, means to bring the blades of the reel to a horizontal position when the reel shaft is thrown out of gear, and means whereby said reel shaft is adjusted.

3. A combined shock and hay loader comprising a wheeled supporting frame, an endless elevator operatively mounted thereon, a shock and hay lifting mechanism whereby the shocks and hay are lifted and thrown onto said elevating mechanism, bearing brackets adjustably and detachably engaged with the frame of the machine, a reel shaft revolubly mounted in said brackets, means whereby said shaft is driven, a reel fixedly mounted on said shaft, said reel comprising oppositely disposed blades, a weighted crank arm fixed on one end of said shaft and adapted to swing the reel blades to a horizontal position when the reel is thrown out of operation, fender plates secured to the shaft of the reel adjacent to the opposite ends of said blades, a reel adjusting lever, reel adjusting rods connected to said reel shaft and to said lever whereby when the latter is rocked in one direction or the other the bearing brackets of said reel shaft will be adjusted and the shaft and reel thereby shifted, and a hand lever connected to said reel adjusting lever whereby the latter may be operated by the driver on the rear end of the machine.

4. In a combined shock and hay loader, a supporting frame, a supporting and operating shaft revolubly mounted on said frame, supporting and operating wheels fixed on said shaft, a tongue connected to the rear end of the frame, a caster wheel bracket fixed on the rear end of the tongue, a caster wheel standard revolubly mounted in said bracket, a steering lever operatively mounted on said standard whereby the latter and said caster wheel may be turned to steer the machine, means to lock said lever, a raising and lowering mechanism, said mechanism comprising a nut operatively mounted on said standard, a raising and lowering screw operatively mounted on said bracket and adapted to engage said nut, a notched head fixed on the upper end of said screw, an operating lever pivotally connected to the upper end of the screw, a tooth formed on said lever and adapted to be engaged with the notches in said head whereby the screw may be turned in the desired direction in said nut thereby raising or lowering the tongue and thus adjusting the forward end of the machine.

5. In a combined shock and hay loader a supporting frame comprising side bars, and a series of cross bars, said side bars having forwardly and upwardly extended ends, a supporting and operating shaft revolubly mounted in said frame, supporting and operating wheels fixedly mounted to said shaft, a counter shaft also revolubly mounted in said frame and geared to said supporting and operating shaft, an elevating mechanism geared to said counter shaft, a lifting mechanism mounted on said counter shaft, bearing boxes removably and adjustably mounted on the extended ends of the side bars of the frame, a reel shaft revolubly mounted in said bearing boxes and thereby adjustably secured to the frame, reel blades fixedly mounted on said shaft, means to gear said shaft to said counter shaft, means to throw said reel shaft out of gear, a weighted arm fixed to one end of said reel shaft whereby when the latter is thrown out of gear the blades thereon will be swung to and held in a horizontal position and a series of shifting rods and levers connected with said shaft whereby the latter and the reel blades thereon may be adjusted forwardly and backwardly with respect to said lifting mechanism.

In testimony whereof I have hereunto set my hand in presence of two subscribing witnesses.

CHRISTIAN CHRISTIANSEN.

Witnesses:
L. F. CLAUSEN,
L. FREDRICKSEN.

---

Copies of this patent may be obtained for five cents each, by addressing the "Commissioner of Patents, Washington, D. C."